United States Patent [19]

Teodoroiu

[11] 3,850,810
[45] Nov. 26, 1974

[54] APPARATUS FOR THE TREATMENT AND THE CLARIFICATION OF WASTE WATER

[75] Inventor: Paul B. Teodoroiu, Bucharest, Romania

[73] Assignee: Institutul De Proiectari Pentru Industria Chimica Anorganica Si a Ingrasamintelor (Ipran), Bucharest, Romania

[22] Filed: Sept. 14, 1972

[21] Appl. No.: 289,064

[52] U.S. Cl. ............... 210/208, 210/219, 210/256, 261/84
[51] Int. Cl. ............................................. B01d 21/14
[58] Field of Search ............ 210/14, 101, 112, 113, 210/137, 208, 219, 256; 261/87, 93, 84, 89; 416/223, 235, 237

[56] References Cited
UNITED STATES PATENTS

| | | | |
|---|---|---|---|
| 1,242,445 | 10/1917 | Ittner | 261/89 |
| 2,530,814 | 11/1950 | De Becze et al. | 261/93 |
| 2,678,915 | 5/1954 | Kalinske | 210/14 X |
| 2,907,712 | 10/1959 | Eidsness et al. | 210/14 X |
| 3,278,170 | 10/1966 | Moritz | 261/93 X |
| 3,313,725 | 4/1967 | Tsuda et al. | 210/208 UX |
| 3,481,868 | 12/1969 | Gilwood et al. | 210/208 X |
| 3,487,017 | 12/1969 | Thorn et al. | 210/208 X |
| 3,731,804 | 5/1973 | Kampjes et al. | 210/113 X |

*Primary Examiner*—Samih N. Zaharna
*Assistant Examiner*—Robert H. Spitzer
*Attorney, Agent, or Firm*—Karl F. Ross; Herbert Dubno

[57] ABSTRACT

Raw or waste water containing solid particles, admixed with a flocculating agent, is introduced from below into a treatment tank so as to enter a downwardly open mixing chamber centered on the tank axis. An agitator in that chamber has a stepped cylindrical body with upper and lower peripheral vanes rotating in such a sense as to impart an upward thrust to the liquid in the upper chamber portion and a downward thrust to the liquid in the lower chamber portion, thereby creating turbulence which is enhanced by stationary but inclined upper and lower baffles. The mixture, exiting from the chamber through a peripheral clearance at the bottom of its housing, forms in the surrounding annular space a layer of clear water.

8 Claims, 2 Drawing Figures

APPARATUS FOR THE TREATMENT AND THE CLARIFICATION OF WASTE WATER

The present invention relates to an apparatus for the treatment and clarification of waste water containing solid particles in suspension.

Conventional clearing tanks operate on the principle of recycling part of the suspended sludge (accelerating type) or of maintaining the sludge in a loose state by varying the output at determined time intervals, e.g., with the aid of a pulsator.

These clearing tanks exhibit the disadvantge that the density distribution in the suspended mass is not uniform over the whole tank area, any more than the flow itself; the circulating speeds are also affected by the shape of the tank. This frequently leads to non-uniform sludge settling in different parts of the clearing tank and retention of smaller-sized or lighter flakes, especially when the suspension ratio in the waste water exceeds 1,500 mg/liter.

In such instances a proportion of solids on the order of 50 mg/liter may remain, which in certain plants is not considered satisfactory.

In accordance with this invention I provide an outer basin or tank centered on a vertical axis, this basin having a waste-water inlet advantageously disposed at the lowest point of its bottom on the axis. Within this tank a mixing chamber is defined by a downwardly diverging open-bottomed housing centered on the same axis above the inlet, this housing being spaced from the tank bottom by a peripheral clearance to let the mixing chamber communicate with a surrounding annular space in the tank. An agitator is the mixing chamber has a body centered on the tank axis for rotation therearound, this body being provided with upper and lower peripheral vanes of opposite pitch preferably disposed on a larger-diameter part and on a smaller-diameter part, respectively, of a stepped cylinder. As this body is rotated in a predetermined sense by suitable drive means, the upper vanes exert an upward thrust and the lower vanes exert a downward thrust upon a mixture of waste water and flocculating agent introduced into the chamber whereby this mixture is intensely circulated and homogenized. After exiting from the chamber through the aforementioned peripheral clearance, the mixture forms a slurry in the surrounding space and above that slurry a supernatant layer of clear water which can be discharged through a collector system.

The above and other features of my invention will now be described in detail with reference to the accompanying drawing in which.

Figure 2:
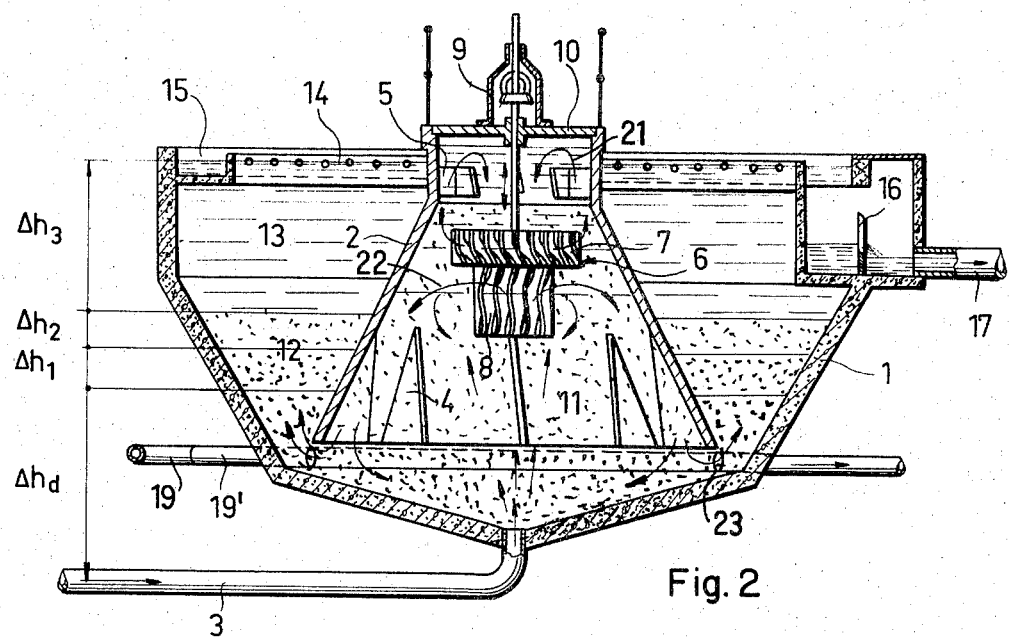
FIG. 2 is a cross-sectional view taken on the line II — II of FIG. 1.
Figure 1:
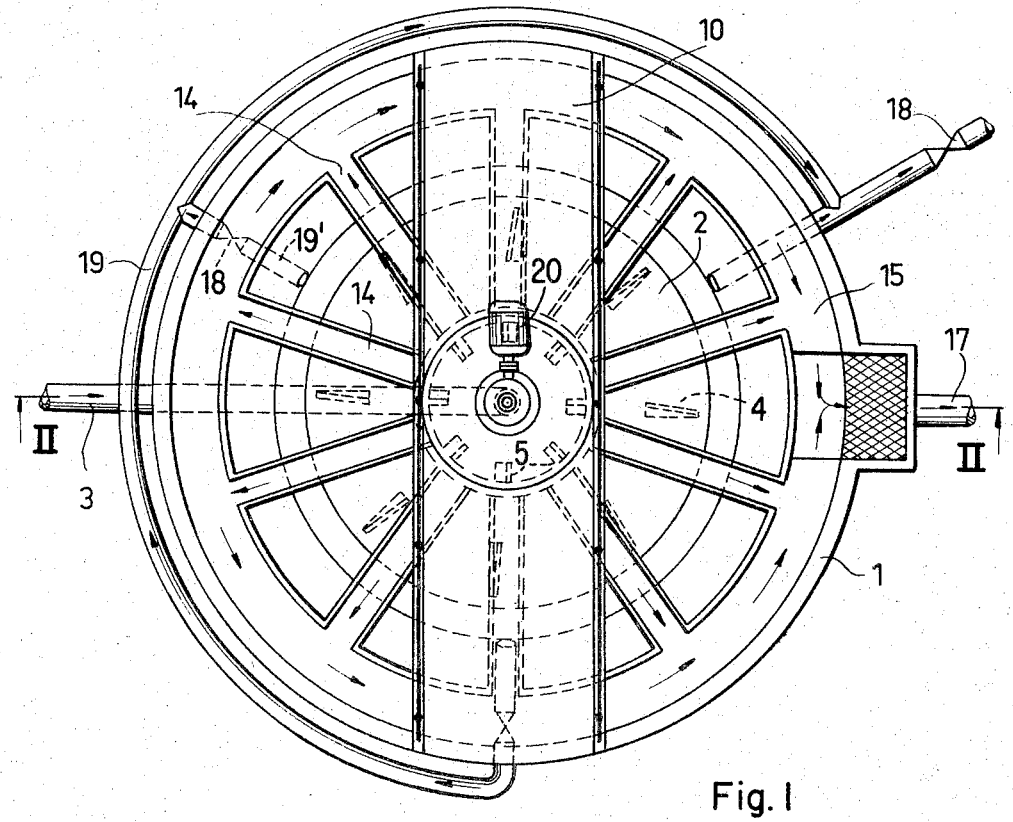
FIG. 1 is a top plan view of an apparatus embodying my invention.

The clearing tank according to my invention comprises an outer vessel 1 of concrete or metal, centered on a vertical axis, and a reaction and mixing chamber 2 which the waste enters at the bottom of its downwardly diverging housing through a pipe 3, under pressure, the vertex of the conical bottom of vessel 1.

The mixing and reaction chamber 2 is provided at the lower part of its inner wall surface with an annular array of inclined lower baffles 4, and at the upper part of that wall surface with an annular array of similarly inclined upper baffles 5; at a suitable elevation between the levels of the two sets of baffles an agitator 6 is centered on the vessel axis. The body of this agitator, having the form of a stepped cylinder, is provided with a first set of vanes 7 on its larger-diameter upper part and with a second set of vanes 8, on its smaller-diameter lower part. Through a speed reducer 9, mounted on a platform 10 at the closed upper end of chamber 2, a drive motor 20 rotates the agitator 6 about its axis for homogenizing a mixture 11 of waste and flocculating agent introduced into the basin.

The direction of rotation of agitator 6 by its drive means 9, 20 is so chosen that, as indicated by arrows 21 and 22, the mixture 11 in chamber 2 is thrust upwardly by the vanes 7 and downwardly by the vanes 8; as clearly shown in the drawing, the two sets of vanes are of opposite pitch and are also spatially curved, each vane having oppositely twisted upper and lower extremities. The presence of the inclined baffles 4 and 5 intensifies the ensuing circulating of the mixture in that chamber. With the influx of additional waste water through pipe 3, some of the mixture exits through a peripheral clearance 23 into the surrounding part of the treatment tank. Agitator 6 may also have some degree of vertical mobility.

In the space between the outer vessel 1 and the reaction and mixing chamber 2 there is formed a slurry or mobile sludge layer 12 along with a supernatant layer 13 of clear water, the whole being in hydrodynamic equilibrium with the swirling mass 11 in chamber 2.

The water passing upwardly through the layer 12, arrives in the clear buffer layer 13 and flows via a group of laterally perforated radial collection troughs 14 over into a peripheral circular channel 15 whence it is discharged, by way of a flow meter 16, into a clear-water conduit 17.

Excess sludge is removed from the slurry 12 by several radially extending extraction pipes 19' communicating with an arcuate manifold 19, the rate of extraction being determined by valves 18 which may be automatically controlled in response to the differential fluid pressure $\Delta h_d$ of slurry 12 as measured by suitable means not shown. This enables the maintenance of an optimum density of the slurry. The pipes 19', as shown, are located at the level of clearance 23.

As further seen from the drawing, the collection troughs 14 are located substantially at the level of the upper baffles 5. With the liquid rising slightly above that level within the upwardly closed chamber 2, the presence of clear water in the region of the troughs is ensured by the aforementioned hydrodynamic equilibrium.

In the slurry 12 is stratification of the finer flakes at levels $\Delta h_1$, $\Delta h_2$ can be observed. The supernatant layer 13 (stratum $\Delta h_3$) is practically free from suspended solids. The system according to my invention offers the following advantages:

the flocculation process is improved;
the volumes of the mixing and reaction chamber and of the clearing tank are reduced;
the construction of the agitator is simplified;
the investment is reduced;
a maximum clearing efficiency and an outstandingly high quality of the treated clear waters is ensured;

it is applicable to suspensions with various mineralogical and chemical compositions and to any proportion of sludge contained in the waste water.

I claim:

1. An apparatus for the treatment of water containing solid particles in suspension, comprising:

an outer basin centered on a vertical axis and provided with an inlet for water to be treated;

a downwardly diverging open-bottomed housing centered on said axis within said basin above said inlet, said housing being spaced from the bottom of said basin by a peripheral clearance whereby a mixing chamber in said housing communicates with a surrounding annular space in said basin;

an agitator in said chamber having a body in the form of a stepped cylinder with a larger-diameter portion and a smaller-diameter portion centered on said axis for rotation therearound, said body being provided with upper and lower peripheral vanes of opposite pitch on said larger-diameter portion and said smaller-diameter portion, respectively;

drive means for rotating said body in a sense causing said upper vanes to exert a generally radially outward thrust with an upward component and said lower vanes to exert a generally radially outward thrust with a downward component upon a mixture of said water with a flocculating agent in said chamber with resulting circulation and homogenization of the mixture; and collector means in said annular space for discharging clear water from a supernatant liquid layer overlying a layer of sludge formed by the flocculation of solid particles upon emergence of said mixture from said chamber.

2. An apparatus as defined in claim 1 wherein the bottom of said basin is upwardly concave and has its lowest point on said axis, said inlet opening into said basin at said lowest point.

3. An apparatus as defined in claim 1 wherein said housing has a closed top, said drive means being mounted above said chamber on said closed top.

4. An apparatus as defined in claim 1, further comprising a first set of inclined stationary baffles on an inner wall surface of said housing above the level of said upper vanes and a second set of inclined stationary baffles on said wall surface beneath the level of said lower vanes.

5. An apparatus as defined in claim 1 wherein said collector means is disposed substantially at the level of said upper vanes.

6. An apparatus as defined in claim 1 wherein each of said vanes has oppositely twisted upper and lower extremities.

7. An apparatus as defined in claim 1, further comprising extraction means for excess sludge opening into said annular space substantially at the level of said clearance.

8. An apparatus for the clarification of water containing solid particles in suspension, comprising:

an outer basin centered on a vertical axis and provided with an inlet for water to be treated;

a downwardly diverging, open-bottomed housing centered on said axis within said basin above said inlet, said housing having a lower edge spaced from the bottom of said basin by a narrow peripheral clearance whereby a treatment chamber in said housing communicates with a surrounding, upwardly diverging annular space in said basin;

an agitator in said chamber having a body centered on said axis for rotation therearound, said body being provided with upper and lower peripheral vanes of opposite pitch;

a set of relatively small, inclined stationary first baffles on an inner wall surface of said housing above the level of said upper vanes;

a set of relatively large, inclined stationary second baffles on said wall surface beneath the level of said lower vanes;

drive means for rotating said body in a sense causing said upper vanes to exert a generally radially outward thrust with an upward component, resulting in a circulation in an upper zone past said first baffles, and said lower vanes to exert a generally radially outward thrust with a downward component, resulting in a circulation in a lower zone past said second baffles, upon a mixture of said water with a flocculating agent in said chamber, thereby homogenizing the mixture and directing a portion thereof downwardly along said wall surface to said clearance for expulsion into said annular space;

collector means in said annular space for discharging clear water from a supernatant liquid layer overlying a layer of sludge formed by the flocculation of solid particles upon emergence of said mixture from said chamber; and extraction means for excess sludge opening into said annular space substantially at the level of said clearance.

* * * * *